(12) United States Patent
Wrotek et al.

(10) Patent No.: US 10,762,682 B2
(45) Date of Patent: Sep. 1, 2020

(54) SKINNING WEIGHTS AND UNDERLYING OBJECT SUPPRESSION OF THREE-DIMENSIONAL IMAGES

(71) Applicant: Electronic Arts, Inc., Redwood City, CA (US)

(72) Inventors: Pawel Piotr Wrotek, San Mateo, CA (US); Darren Douglas Gyles, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 15/927,689

(22) Filed: Mar. 21, 2018

(65) Prior Publication Data

US 2019/0295303 A1    Sep. 26, 2019

(51) Int. Cl.
G06T 13/20    (2011.01)
G06T 17/20    (2006.01)

(52) U.S. Cl.
CPC ............ *G06T 13/20* (2013.01); *G06T 17/205* (2013.01)

(58) Field of Classification Search
None
See application file for complete search history.

(56) References Cited

U.S. PATENT DOCUMENTS

| | | | |
|---|---|---|---|
| 6,192,155 B1 | 2/2001 | Fan | |
| 8,368,712 B2 * | 2/2013 | DeRose | G06T 19/00 345/419 |
| 8,681,147 B1 | 3/2014 | Baraff et al. | |
| 8,704,823 B1 | 4/2014 | Waggoner et al. | |
| 9,626,809 B1 | 4/2017 | Nair et al. | |
| 9,892,540 B2 | 2/2018 | Nair et al. | |
| 2003/0052887 A1 * | 3/2003 | Parikh | G06T 15/005 345/522 |
| 2006/0267978 A1 * | 11/2006 | Litke | G06T 17/20 345/419 |
| 2007/0024632 A1 * | 2/2007 | Couture-Gagnon | G06T 17/20 345/581 |
| 2008/0303840 A1 | 12/2008 | Zhou et al. | |
| 2011/0292034 A1 * | 12/2011 | Corazza | G06T 17/20 345/419 |

(Continued)

OTHER PUBLICATIONS

Oh et al, "Generating Unified Model of Dressed Virtual Humans", Pacific Graphics, 2005. (Year: 2005).*

(Continued)

*Primary Examiner* — Kee M Tung
*Assistant Examiner* — Patrick F Valdez
(74) *Attorney, Agent, or Firm* — Lee & Hayes, P.C.

(57) ABSTRACT

A graphics processing system and method reduce and/or eliminate artifacts during animation by modifying skinning weights used for animating three-dimensionally imaged, compound objects having at least a first object and a second object. The graphics processing system and method identifies a first vertex of a first mesh of a first object and determines that it corresponds to a second vertex from a second mesh of a second object. The graphics processing system determines skinning weights of the second vertex and generates modified skinning weights. The graphics processing system can then animate the second object in some embodiments using the modified skinning weights.

20 Claims, 8 Drawing Sheets

(56) References Cited

U.S. PATENT DOCUMENTS

| | | | |
|---|---|---|---|
| 2013/0297058 A1* | 11/2013 | Griffith | G06F 17/50 |
| | | | 700/98 |
| 2014/0052427 A1 | 2/2014 | Yahiaoui et al. | |
| 2014/0253551 A1 | 9/2014 | Schmidt | |
| 2016/0027200 A1* | 1/2016 | Corazza | G06T 13/40 |
| | | | 345/420 |
| 2016/0030839 A1 | 2/2016 | Nair et al. | |
| 2016/0035142 A1 | 2/2016 | Nair et al. | |
| 2016/0117865 A1 | 4/2016 | Nair et al. | |
| 2016/0163103 A1* | 6/2016 | DeTemmerman | G06N 3/006 |
| | | | 345/419 |
| 2017/0032560 A1* | 2/2017 | Dionne | G06T 13/40 |
| 2018/0122140 A1* | 5/2018 | Janzer | G06T 15/40 |
| 2019/0035149 A1* | 1/2019 | Chen | G06T 15/04 |
| 2019/0304184 A1 | 10/2019 | Wrotek et al. | |

OTHER PUBLICATIONS

Zhang et al, "Collision Detection for Clothed Human Animation", IEEE Proc. Eighth Pacific Conf. on Computer Graphics and Applications, pp. 328-337, 2000. (Year: 2000).*

* cited by examiner

SKINNING WEIGHTS AND UNDERLYING OBJECT SUPPRESSION OF THREE-DIMENSIONAL IMAGES

BACKGROUND

Three-dimensional images may be rendered for various purposes, such as video games, online gaming, scientific purposes, object modeling, documentation, or the like. In some cases, these images may also be animated, such as in a video game, or to model the movement of objects for scientific purposes, etc. Weights may be associated with how portions of the object move when animated. Additionally, in some implementations, there may be a mechanism to add one or more object(s) on the surface of an object. Such agglomeration of objects in an image may result in artifacts when rendering the image and/or animating the image.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Example embodiments of this disclosure describe methods, apparatuses, computer-readable media, and systems for manipulating skinning weights at vertices of an underlying base geometry when an overlying geometry is provided over the base geometry in a three-dimensional image of an object. Additionally, example embodiments of this disclosure describe methods, apparatuses, computer-readable media, and systems for suppressing an underlying geometry over which an overlying geometry may be provided in a three-dimensional image of an object.

According to example embodiments of the disclosure, three-dimensional objects, such as video game characters, may be rendered as images on a display screen, such as a video display of a computer or video game machine. These images may be generated by creating a mesh of the object image, where the mesh includes a plurality of vertices on the outer surface of the object that is to be rendered as an image. The vertices, as provided in a two-dimensional projection of three-dimensional space, may define the shape of the imaged object. The vertices of the mesh also define polygons (e.g., triangles, quadrilaterals, pentagons, etc.) therebetween. The number of vertices, and therefore, the number of polygons in the mesh, may be selected to provide a sufficient resolution of topography of the object being imaged, as a trade-off to the amount of processing bandwidth used to image and/or animate the image of the object.

According to example embodiments of the disclosure, an image of an object may be animated. As an example, an image of a character in a video game, such as an image of a boy walking down a street, may be animated. During animation, a rig of the object of the image may be used, where the rig may define virtual bones of the character of the object, and how those bones move as the character is animated. The skinning weights of each of the vertices define which bones and/or joints of the rig cause a movement in each of the vertices, as well as a magnitude of influence each bone and/or joints of the rig has on the movement of each of the vertices. In other words, the skinning weights correspond to the amount of movement of the corresponding vertex of the image mesh based at least in part on the bones and/or joints of the rig to which the vertex is linked, when the object is animated. For example, if the boy is animated as walking down a street, a vertex on the boy's forearm may have skinning weights representing its movement as the boy's forearm and elbow moves. Thus, vertices of an object mesh, during animation, may move based at least in part on movement of more than one bones and/or joints of the animation rig. A larger skinning weight ascribed to a particular joint and/or bone may result in a relatively greater magnitude of movement of the vertex when the joint and/or bone moves.

In example embodiments, images may be generated where overlying object(s) may be provided overlying a base object. For example, a base object may be a cat with a minimal amount of fur rendered as an image. A user, such as a video game player who wishes to customize his/her cat, interacting with this image may wish to provide a greater volume of fur on the cat. This fur may be added, by the user, by providing the fur (i.e., overlying object) over the base object (i.e., cat). In example embodiments, the user may select fur and snap on the selected fur as a snap-on object onto the base object of the cat with minimal fur. When the cat with additional fur (e.g., the underlying cat with minimal fur with addition fur positioned thereon) is animated, the additional fur may have corresponding skinning weights, and the underlying base geometry of the cat with minimal fur may also have corresponding skinning weights. Each set of skinning weights may define the movement of corresponding vertices of the mesh of the geometry to which the skinning weight pertains.

In example embodiments, when an image is animated of a compound object, having a base geometry and an overlying geometry, such as the cat with fur described above, artifacts may arise due to interaction of the mesh of the base geometry with the mesh of the overlying geometry. In some cases, the skinning weights for the base geometry and the overlying geometry may not seamlessly animate the compound object properly. This may occur if the skinning weights of the vertices of the underlying geometry are not compatible with the skinning weights of the vertices of the overlying geometry. According to example embodiments, of the disclosure, skinning weights of vertices of objects and/or underlying objects may be modified based at least in part on skinning weights of overlying vertices of overlying objects.

In example embodiments of the disclosure, when an overlying object is placed over, proximate to, and/or in contact with at least a portion of a base object, the skinning weights of the base object may be modified according to the skinning weights of the overlying object. A vertex of the mesh of the overlying object may be identified. An associated vertex in the mesh of the underlying base object corresponding to the overlying object's vertex may be identified. This association between the first vertex in the overlying object and the second vertex in the underlying object may be identified by any suitable mechanism, such as by using a deformation map (DMAP) of the base object and/or the overlying object, or by determining proximity of the two corresponding vertices when the overlying object is placed onto the base object. For example, the DMAP may indicate correspondence of a vertex from the overlying object with a vertex from the base object. In this way, vertices of the base object corresponding to individual ones of the vertices of the overlying object may be determined.

When the corresponding vertices between the overlying object and the base object are identified, the skinning weights of the base object mesh vertices may be reduced. By reducing the skinning weights in the underlying or base object mesh vertex, the movement of the underlying geometry of the base object cannot exceed the movement of the overlying geometry in any direction. Thus, in a sense, the movement of the overlying object during animation controls the perceived movement of the compound object in regions covered by the overlying object. The skinning weights for underlying and/or base geometry may be modified in this way for animating the compound object.

In further example embodiments, when a compound object is created by placing an overlying object over a base object, it may be determined whether a particular vertex of the overlying object mesh is an edge vertex or an interior vertex. An interior vertex may be, for example, a vertex that is surrounded on all sides (360 degrees) by polygons of the overlying mesh. On the other hand, an edge vertex may be, for example, a vertex that is only partially (less than 360 degrees) surrounded by polygons of the overlying mesh.

If a vertex is determined to be an edge vertex of the overlying mesh, then the skinning weights of the corresponding vertex base mesh may be set to the skinning weights of the edge vertex of the overlying object mesh. If, however, the vertex is an interior vertex, then the corresponding vertex of the base mesh may be removed from the base mesh. In other words, the portion of the base mesh masked by an overlying object may be removed in its entirety, in some example embodiments. The base vertices corresponding to interior vertices of the overlying object may, therefore, not be drawn when covered by the overlying object. Furthermore, the base vertices corresponding to edge vertices of the overlying object may move with the same magnitude as the overlying edge vertex during animation. This modification of the skinning weights may reduce and/or prevent artifacts during animation of compound objects.

According to additional embodiments of the disclosure, if an overlying object is provided over a base object and/or other overlying object, the projections of the base geometry and/or other overlying object may be suppressed. This may be done to avoid image artifacts arising from underlying geometries projecting into or through an overlying geometry. The suppression of an underlying geometry may be affected by moving the vertices of the underlying geometry in a manner to reduce the size and/or volume of the underlying features. In some cases, this may involve the modification of DMAP and/or deformation levels stored therein.

In example embodiments, features of underlying geometry may be suppressed according to magnitude(s) that may be encoded onto a data channel associated with vertices of the underlying object. For example, if a base object is a cat with fur on its head, and an overlying object of a hat is provided over the cat's head, fur at the cat's head may be suppressed when the hat is placed on the cat. By suppression of the fur, image artifacts may be avoided and the three-dimensional image of the cat may appear more life-like. In an aspect, suppressing the fur on the cat's head when placing a hat thereon may imitate reality where a live cat's fur may be matted under a hat placed thereon. In example embodiments, the magnitude of the suppression may be determined by any suitable automated mechanism, or may be provided by an artist of the three-dimensional object.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

Figure 1:
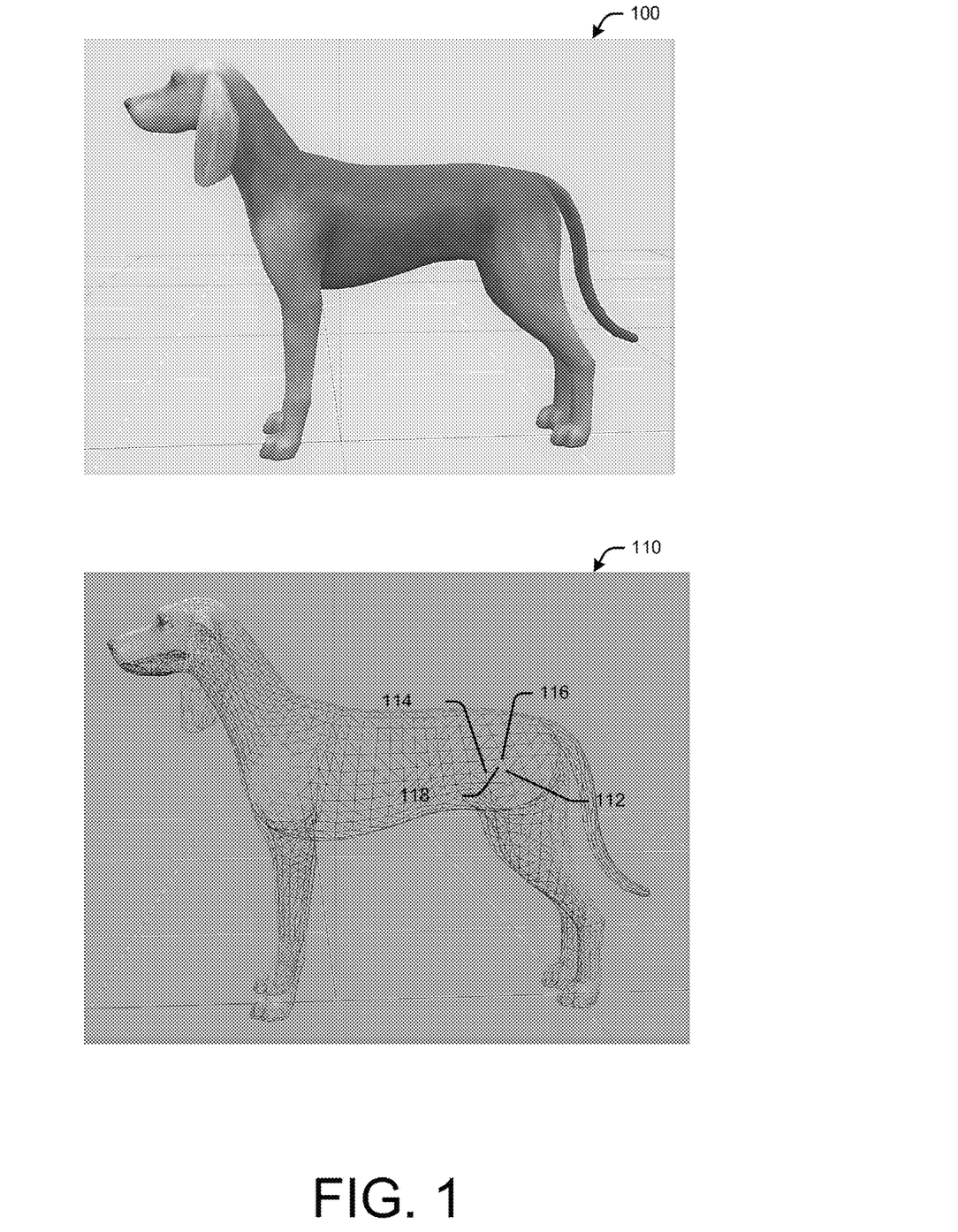
FIG. 1 illustrates a schematic diagram of an example three-dimensional image of a character and its corresponding mesh, in accordance with example embodiments of the disclosure.

FIG. 1 illustrates a schematic diagram of an example three-dimensional image of a character and its corresponding mesh, in accordance with example embodiments of the disclosure.

The image 100 shows a three-dimensional (3D) rendering of a dog. As can be seen, the 3D rendering may be a two-dimensional (2D) projection of a 3D object. Although a dog is used as an example object and image throughout this description, it will be appreciated that the systems, methods, and computer-readable media, as disclosed herein, may apply to any suitable object. The image 100 is shown in a particular direction, such as from a front-side view, of the dog. It will be appreciated that the dog in the image 100 can be rotated in any suitable direction in accordance with example embodiments of the disclosure. The image 100 may be generated by one or more image manipulation system(s) where a user may create the image 100 by defining various characteristics of the dog, such as the texture at various places on the dog's surface. For example, an artist may define the color of the fur on the dog.

In one aspect, the dog of image 100 may be a base object, where other objects may be added thereon to generate compound objects. These additional objects may be objects that may be proximal or in contact with the base object. In example embodiments, a user may interact with image manipulation system(s) to add overlying objects onto the base object to create compound objects. For example, in the case of the dog of image 100, overlying objects, such as fur or pet clothes may be added onto the base object of the dog.

In creating the image 100 of the dog, image manipulation system(s) may generate a mesh 110 of the dog. The mesh 110, or wire mesh, is generated by defining vertices over a surface of the object of image 100 to define the object, such as the dog. For example, mesh 110 may include vertices 112, 114, 116. These vertices 112, 114, 116 may define a polygon 118 therebetween. Although the polygon in this case is a triangle having three vertices 112, 114, 116, it should be understood that any suitable polygon, such as a rectangle or a pentagon, may define a portion of the surface of the object of image 100.

Figure 2:
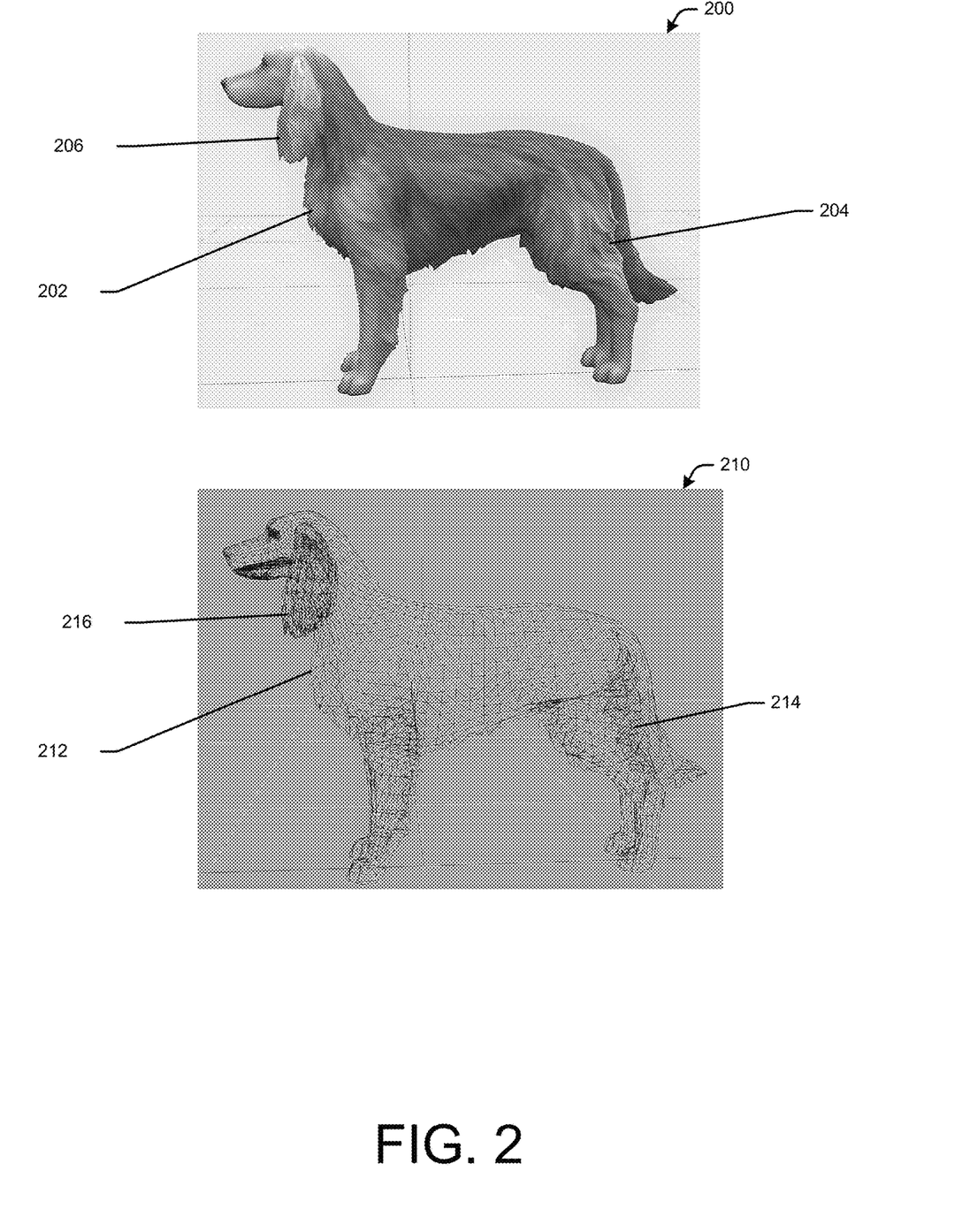
FIG. 2 illustrates a schematic diagram of example fur added on to the three-dimensional image of the character of FIG. 1 and its corresponding mesh, in accordance with example embodiments of the disclosure.

FIG. 2 illustrates a schematic diagram of example fur 202, 204, 206 added on to the three-dimensional image 100 of the character of FIG. 1 and its corresponding mesh 210, in accordance with example embodiments of the disclosure.

The fur 202, 204, 206, as added onto base object of image 100 to generate image 200 may be added by a user interacting with image manipulation system(s). The user may be able to select pieces of fur and snap them onto the base object of the dog, such as by dragging images of the fur 202, 204, 206 onto the base object image 100. For example, a user may drag the fur 202 on the dog's chest onto the base object of the dog, and drag the fur 204 on the dog's tail onto the base object of the dog, and drag the fur 206 on the dog's ears onto the base object of the dog. By adding these overlying objects (e.g., pieces of fur 202, 204, 206) onto the base object, a compound object (e.g., dog with fur) may be created in image 200.

Image 210 may be a mesh corresponding to the compound object of image 200. In this case, overlying mesh 212 may correspond to fur 202, overlying mesh 214 may correspond to fur 204, and overlying mesh 216 may correspond to fur 206. Overlying mesh 212, 214, 216 may overlie the base mesh and cover portions of the base mesh. The overlying mesh 212, 214, 216 may also have edges where they are in contact with the base mesh. These edges may be defined by edge vertices on the overlying mesh 212, 214, 216. The interior of the mesh 212, 214, 216 may include interior vertices. These interior and edge vertices of an overlying mesh will be discussed in greater detail in conjunction with FIG. 3.

The vertices of the overlying mesh 212, 214, 216 may have skinning weights associated therewith. Additionally, the vertices of the base mesh may also have skinning weights associated therewith. According to example embodiments, the skinning weights of the base vertices covered over by, in contact with, or in proximity to the mesh 212, 214, 216 may be modified when the fur 202, 204, 206 is placed over the base object.

In example embodiments, the compound image 200 may be formed by a user other than the user who formed the image 100. For example, the images 100, 200 may be generated as part of a video game, such as an online game. The online game may be any suitable game, such as, for example, life simulation games, such as SIMS 4™ by Electronic Arts Inc. of Redwood City, Calif. In such a simulation game, an online player may customize an object of images on a client device (e.g., home computer, game machine, Sony Play Station™, etc.) which is communicatively coupled to an image manipulation system. The image manipulation system may perform the skinning weight modification, as discussed herein, when overlying objects (e.g., fur) are placed on base objects (e.g., dog). Although the disclosure herein may be discussed in the context of video games and/or online gaming, it should be appreciated that the disclosure, according to example embodiments, apply to image manipulation for other purposes, such as scientific image manipulation, modeling, and/or various other forms of 3D virtualizations.

Figure 3:
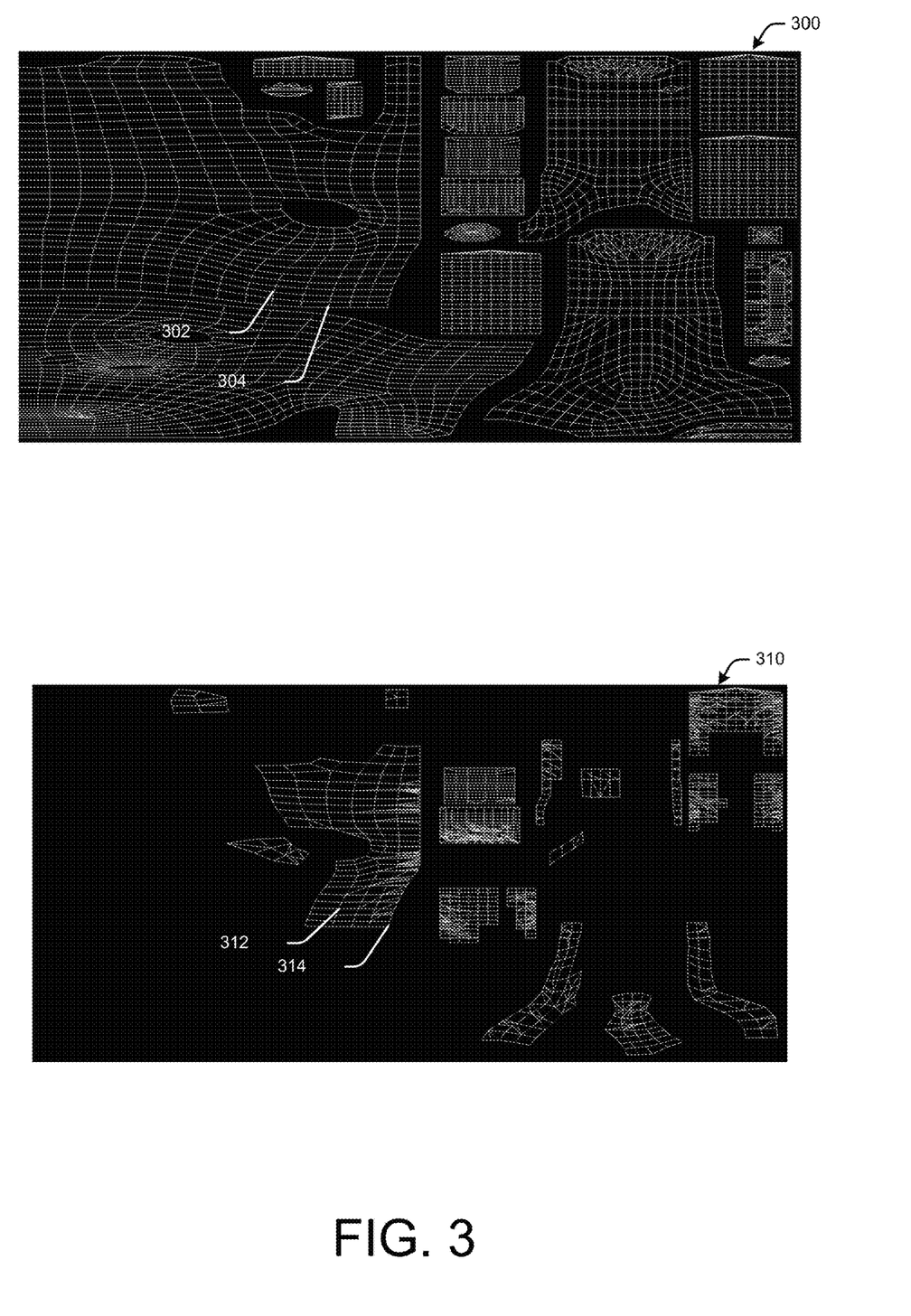
FIG. 3 illustrates a schematic diagram of an example laid-out mesh of an overlying object and a base object, in accordance with example embodiments of the disclosure.

FIG. 3 illustrates a schematic diagram of an example laid-out mesh 300 of a base object and a laid-out mesh 310 of an overlying object, in accordance with example embodiments of the disclosure. The laid-out mesh 300 of the base object and the laid-out mesh 310 of the overlying object may be generated by one or more image manipulation system(s), based at least in part on user input.

In the laid-out mesh of the overlying object 310 may include a plurality of vertices, including interior vertex 312 and edge vertex 314. The interior vertex 312 may be surrounded by polygons of the laid-out mesh of the overlying object on all sides. In contrast, the edge vertex 314 may not be surrounded by polygons of the laid-out mesh of the overlying object on all sides.

When the overlying object corresponding to the laid-out mesh 310 is placed over the base object corresponding to the laid-out mesh 300, the corresponding vertices of laid-out mesh 300 may be determined for the vertices of laid-out mesh 310, including vertices 312, 314. In example embodiments, this determination of corresponding vertices between the overlying object and the base object may be made by any suitable mechanism. In some cases, one or more DMAPs associated with the compound object may be used to find vertices from the overlying object that are relatively proximal to vertices from the base object. For example, UV coordinates from the DMAP(s) may be utilized for finding the vertex from the base object that is most proximal to the vertex from the overlying object for which a correspondence is to be determined. Thus, in some cases, UV coordinates of the laid-out meshes 300, 310 may be used to determine vertices correspondence between the overlying laid-out mesh 310 and the base laid-out mesh. For example, vertices with the same UV coordinates, or within a threshold of each other, may be paired from one laid-out mesh to another.

In this example, interior vertex 312 of the overlying object laid-out mesh 310 may correspond to vertex 302 of the base object laid-out mesh 300. Similarly, edge vertex 314 of the overlying object laid-out mesh 310 may correspond to vertex 304 of the base object laid-out mesh 300. The vertex on the base object laid-out mesh corresponding to an edge vertex of the overlying object laid-out mesh may not necessarily be, and in most cases, will not be, an edge vertex itself.

According to example embodiments, the skinning weights of vertex 304 may be modified when the overlying object corresponding to overlying laid-out mesh 310 is placed over the base object corresponding to laid-out mesh 300. In some example embodiments, the skinning weights of vertex 304 may be set to the skinning weights of vertex 314. Other vertices of base object laid-out mesh 300 which are not covered or just adjacent to the overlying object laid-out mesh 310 may not be modified from its original values. Additionally, the vertex 302 from the base object may be removed in its entirety. The modification of the deformation weights of some of the base object vertices may prevent and/or mitigate artifacts, such as inconsistent movement of a base object and an overlying object, during animation. In example embodiments, the rigging files, animation files, or buffers with skinning weights corresponding to the base object may be updated according to the modifications of skinning weights of vertices of the overlying object.

Figure 4:
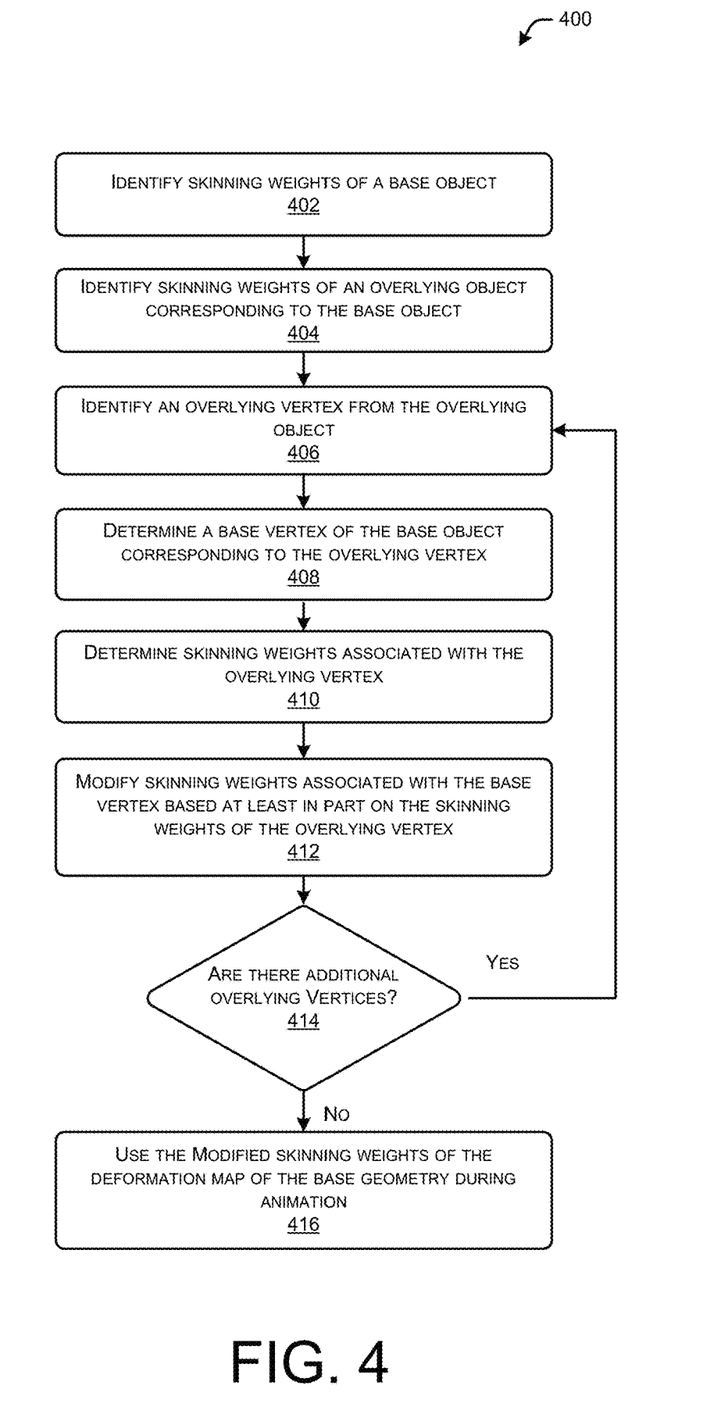
FIG. 4 illustrates a flow diagram of an example method to modify skinning weights for mesh vertices of a base object when an overlying object is provided over the base geometry, in accordance with example embodiments of the disclosure.

FIG. 4 illustrates a flow diagram of an example method 400 to modify skinning weights for mesh vertices of a base object when an overlying object is provided over the base geometry, in accordance with example embodiments of the disclosure. Method 400 may be performed by one or more image manipulation system(s) in example embodiments. In some cases, the image manipulation system(s) may cooperate with one or more other computing system(s) to perform the processes of method 400. The method 400, in example embodiments, may be performed in response to user input(s), such as input(s) that direct the creation of compound object, such as an object made as a base object with an overlying object over portions of the base object, images. These user inputs may be to the image manipulation system(s) directly, or via one or more client devices.

At block 402, skinning weights of a base object may be identified. The skinning weights of the base object may be stored and/or managed by the image manipulation system(s), such as in memory and/or one or more data files. An object and/or animation file of the base object may store skinning weights corresponding to each of the vertices of the base object mesh. The skinning weights of the base object may be assigned by any suitable mechanism, such as by a user who created the base object. In some cases, tools may be used to "paint" skinning weights onto vertices of the base geometry. The skinning weights may be assigned such that the base object's movements look natural during animation. In example embodiments, the skinning weights of the base object may be updated with new skinning weights of its constituent vertices, such as by the processes that follow.

At block 404, a skinning weights of an overlying object corresponding to the base object may be identified. The overlying object, in this case may be selected by a user to place over the base object. Similar to the skinning weights of the base object, the skinning weights of the overlying object may be stored and/or managed by the image manipulation system(s). Also, the skinning weights of the overlying object may be stored in memory or in a file that stores skinning weights corresponding to each of the vertices of the overlying object mesh. The skinning weights of the overlying object may be assigned by any suitable mechanism, such as by a user who created the overlying object. The skinning weights may be assigned such that the overlying object's movements look natural during animation.

At block 406, an overlying vertex from the overlying object may be identified. The overlying vertex may be selected by any suitable mechanism, such as in progression from one side of the overlying mesh to the other, or randomly, etc.

At block 408, a base vertex of the base object corresponding to the overlying vertex may be determined. In some cases, the corresponding base vertex may be determined based at least in part on one or more DMAPs associated with the compound object. In these cases, UV coordinates or mesh coordinates of the vertices of the overlying object mesh may be compared to UV/mesh coordinates of the vertices of the base object mesh to determine the correspondence between vertices of the overlying object mesh and the base object mesh. A vertex from the base object may be found to correspond to the identified overlying vertex, if the UV coordinates of the overlying vertex is the same as or relatively close to the UV coordinates of a vertex from the base object. In example embodiments, a corresponding base vertex of the overlying vertex may be determined by identifying the vertex from the base object mesh that is most proximal to the vertex of the overlying object mesh when the overlying object is placed on the base object.

At block 410, skinning weights associated with the overlying vertex from the overlying object mesh may be determined. This determination may be based at least in part on accessing the overlying vertex in memory or a file with skinning weights of the overlying object and finding the corresponding skinning weights of that overlying vertex.

At block 412, skinning weights associated with the base vertex may be modified based at least in part on the skinning weights of the overlying vertex. The modification may be a value that is equal to or less than the skinning weights of the corresponding overlying vertex. In some cases, if the overlying vertex is an interior vertex, then the corresponding base vertex may be removed, rather than modification of its skinning weights. If the overlying vertex is an edge vertex, then the skinning weights of the base vertex may be set to the same value as the overlying edge vertex.

At block 414, it may be determined if there are any additional overlying vertices from the overlying object. If there are any more overlying vertices, then the method 400 may return to block 406 to modify the next base vertex corresponding to the next overlying vertex. If, on the other hand, there are no more overlying vertices, then the method 400 may proceed to block 416 where the modified skinning weights of the base object may be used for animation.

According to some embodiments, the operations of method 400 may be performed out of the order presented, with additional elements, and/or without some elements. Some of the operations of method 400 may further take place substantially concurrently and, therefore, may conclude in an order different from the order of operations shown above.

Figure 5:
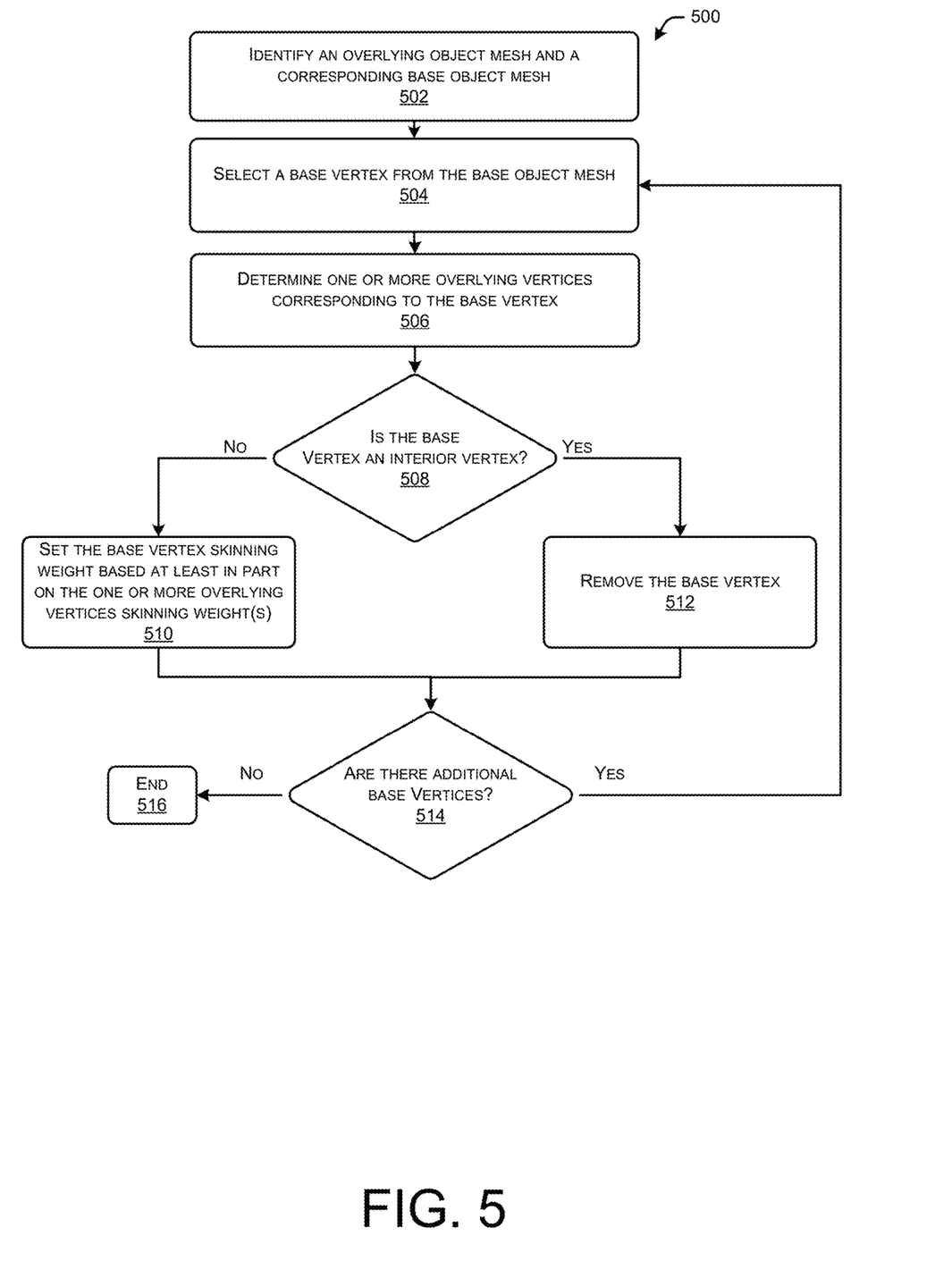
FIG. 5 illustrates a flow diagram of an example method to modify skinning weights for border base mesh vertices and remove internal base mesh vertices of a base object when an overlying object is provided over the base geometry, in accordance with example embodiments of the disclosure.

FIG. 5 illustrates a flow diagram of an example method 500 to modify skinning weights for border base mesh vertices and remove internal base mesh vertices of a base object when an overlying object is provided over the base geometry, in accordance with example embodiments of the disclosure. Method 500 may be performed by one or more image manipulation system(s) in example embodiments. In some cases, the image manipulation system(s) may cooperate with one or more other computing system(s) to perform the processes of method 500. The method 500, in example embodiments, may be an implementation of the operations of block 412 of method 400 of FIG. 4.

At block 502, an overlying object mesh may be identified, as well as a corresponding base object mesh. As described above, the corresponding base vertex of the overlying vertex may be determined by identifying the vertex from the base object mesh that is most proximal to the vertex of the overlying object mesh when the overlying object is placed on the base object. In some cases, UV coordinates of the vertices of the overlying object mesh may be compared to UV coordinates of the vertices of the base object mesh to determine the correspondence between vertices of the overlying object mesh and the base object mesh.

At block 504, a base vertex from the base object mesh may be selected. The base vertex may be selected by any suitable mechanism, such as in progression from one side of the base mesh to the other, or randomly, etc.

At block 506, one or more overlying vertices corresponding to the base vertex may be determined. As discussed above, UV coordinates or mesh coordinates of the vertex of the base object mesh may be compared to UV/mesh coordinates of the vertices of the overlying object mesh to determine the correspondence between the vertex of the base object mesh and the vertices of the overlying object mesh. If the UV coordinates of an overlying vertex perfectly matches the UV coordinates of the base vertex, then that overlying vertex may be determined as the corresponding overlying vertex to the base vertex. However, if there is no perfect match between an overlying vertex with the base vertex, then a predetermined number of overlying vertices may be deemed to correspond to the base vertex. For example, the two overlying vertices that are most proximal to the base vertex may be determined to correspond to the base vertex. In other example embodiments, the three nearest overlying vertices of the overlying mesh may be determined to correspond to the base vertex. To make the determination of which overlying vertices correspond to the base vertex, the UV coordinates of the overlying vertices may be compared to the underlying base vertex. In alternative embodiments, the number of overlying vertices determined to correspond to the base vertex may be determined based at least in part on how many of the overlying vertices lie within a predetermined distance of the base vertex.

At block 508, it may be determined if the base vertex is an interior vertex. In other words, it may be determined if the base vertex is completely occluded when the overlying object is placed over the base object. The base vertex may be determined to be an interior vertex if all of the overlying vertices are interior vertices. As described above, an interior vertex of the overlying mesh may be a vertex that is completely surrounded by polygons of the overlying mesh. In other words, there may be no portion within a 360 degree circle around an interior vertex of the overlying mesh where there is no polygon of the overlying mesh. If a vertex is not an interior vertex, then that vertex is an edge vertex. In that case, the edge vertex of an overlying mesh does not have polygons of the overlying mesh surrounding that edge vertex. Thus, at least a portion of the 360 degree circle around an edge vertex of the overlying mesh may not have a polygon of the overlying mesh.

If it is determined at block 508 that the base vertex is an interior vertex, then the method 500 may proceed to block 512 where the base vertex may be removed from the base object mesh. In this case, the base vertex, as completely occluded by the overlying geometry, may be removed from the base geometry.

If, on the other hand, at block 508 it was determined that the base vertex is not an interior vertex of the base mesh, then the method 500 may proceed to block 510. In this case the base vertex may be visible when the overlying object is placed over the base object. In this case, at block 510 the base vertex skinning weights may be set based at least in part on the corresponding overlying vertices skinning weights. In the case where there is a single corresponding overlying vertex to the base vertex, the base vertex skinning weights may be set to the same value as the overlying vertex weights. For example, if the base vertex originally has a skinning weight of 0.6 to bone_1 of an animation rig, and 0.3 to bone_2 of the animation rig, but the overlying vertex has skinning weights of 0.4 and 0.25, respectively, then the skinning weights of the base vertex may also be modified to be 0.4 and 0.25 respectively. In this way, during animation the base vertex and the overlying vertex, which are in close proximity to each other, may move with substantially the same magnitude during animation.

From blocks 510 and 512, the method 500 may proceed to block 514 where it may be determined if there are additional base vertices in the base object mesh to be considered for removal and/or resetting of skinning weights. If there are additional vertices then the method 500 may return to block 504 to modify additional base object mesh vertices. If, on the other hand, at block 514 there are no more overlying vertices, then the method 500 may end at block 516.

According to some embodiments, the operations of method 500 may be performed out of the order presented, with additional elements, and/or without some elements. Some of the operations of method 500 may further take place substantially concurrently and, therefore, may conclude in an order different from the order of operations shown above.

Figure 6:
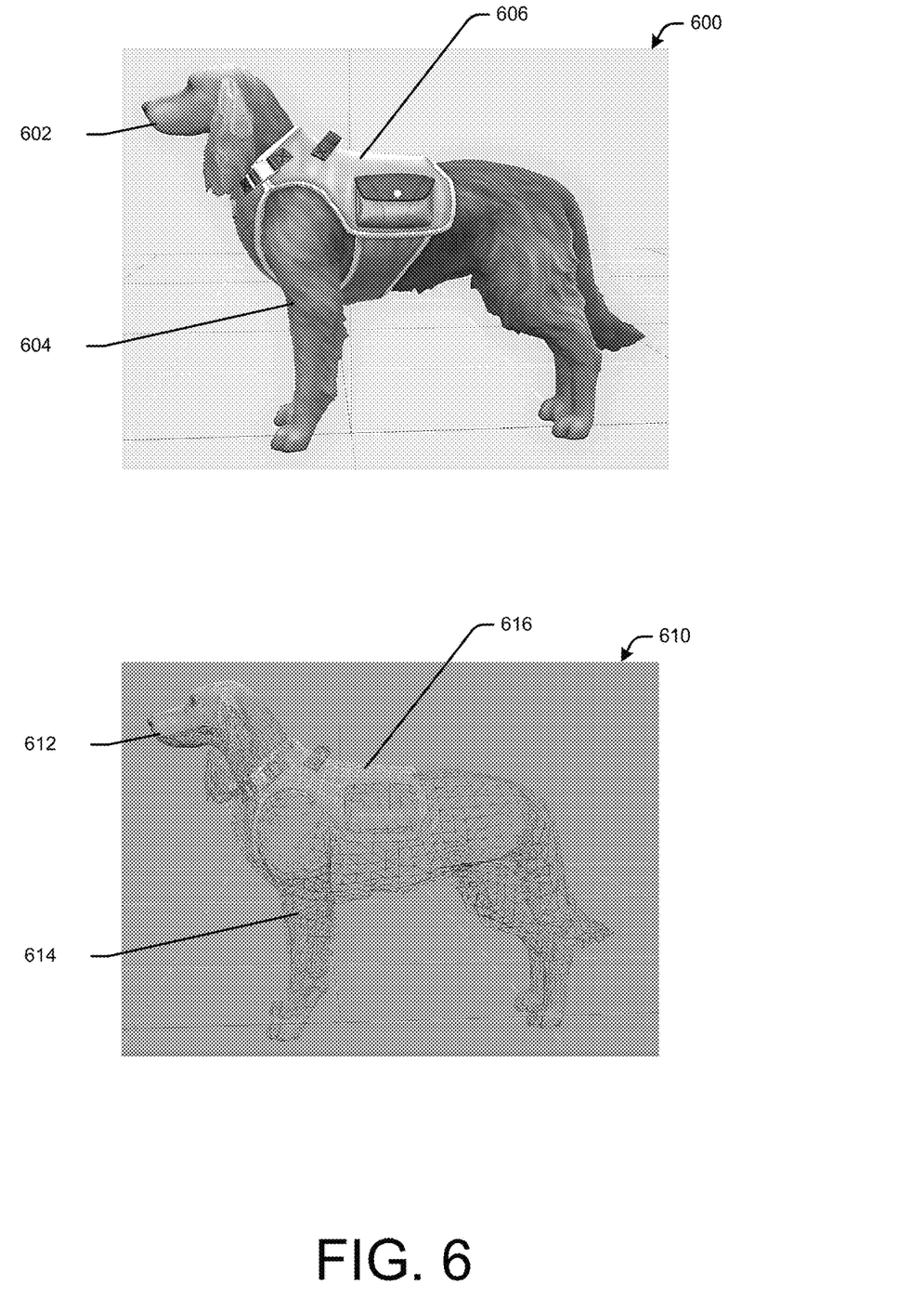
FIG. 6 illustrates a schematic diagram of an example overlying object placed over fur of the character of FIG. 3, along with its mesh, in accordance with example embodiments of the disclosure.

FIG. 6 illustrates a schematic diagram of an example overlying object placed over fur of the character of FIG. 3, along with its mesh, in accordance with example embodiments of the disclosure.

Image 600 may include a compound object, where there may be a base object in the form of a dog 602, with a first overlying object in the form of fur 604, and with a second overlying object in the form of clothes 606. The corresponding mesh of the objects 602, 604, 606 of image 600 may be image 610 with base mesh 612, first overlying object mesh 614, and second overlying object mesh 616. In this case, when the clothes 606 are placed over the fur 604, the fur 604 may be suppressed.

Suppression of the fur may entail reduction of the volume of the fur 604. The volume of the fur 604 may be reduced by moving one or more vertices of the fur in mesh 614 closer to the interior of the mesh. In this way, the fur 604 may not interfere with the clothes 606 that are placed on it in image 600. A level of suppression of the fur 604 may be encoded on to corresponding vertices of the mesh 614, such as by using meta data or data channels of the vertices. The vertices of a mesh, such as the fur mesh 614, may have data channels, such as data channels corresponding to color associated therewith, such as red, green, blue (RGB) channels. In example embodiments, there may be other data channels and/or metadata where the level of fur suppression may be encoded. These data channels may be used to encode the fur suppression level for later suppression of the fur 604 when the clothes are placed thereon. For example, the level of fur suppression may be encoded onto the green channel of the fur vertices where the fur 604 is to be suppressed.

The fur 604 and clothes 606 are only examples, and it should be understood that the suppression of an underlying object may apply in any context, including other characters and/or objects. In some cases, the suppression may be of a base object, and in other cases, such as this example, the suppression may be driven by one overlying object (e.g., clothes 606) to suppress another overlying object (e.g., fur 604).

Figure 7:
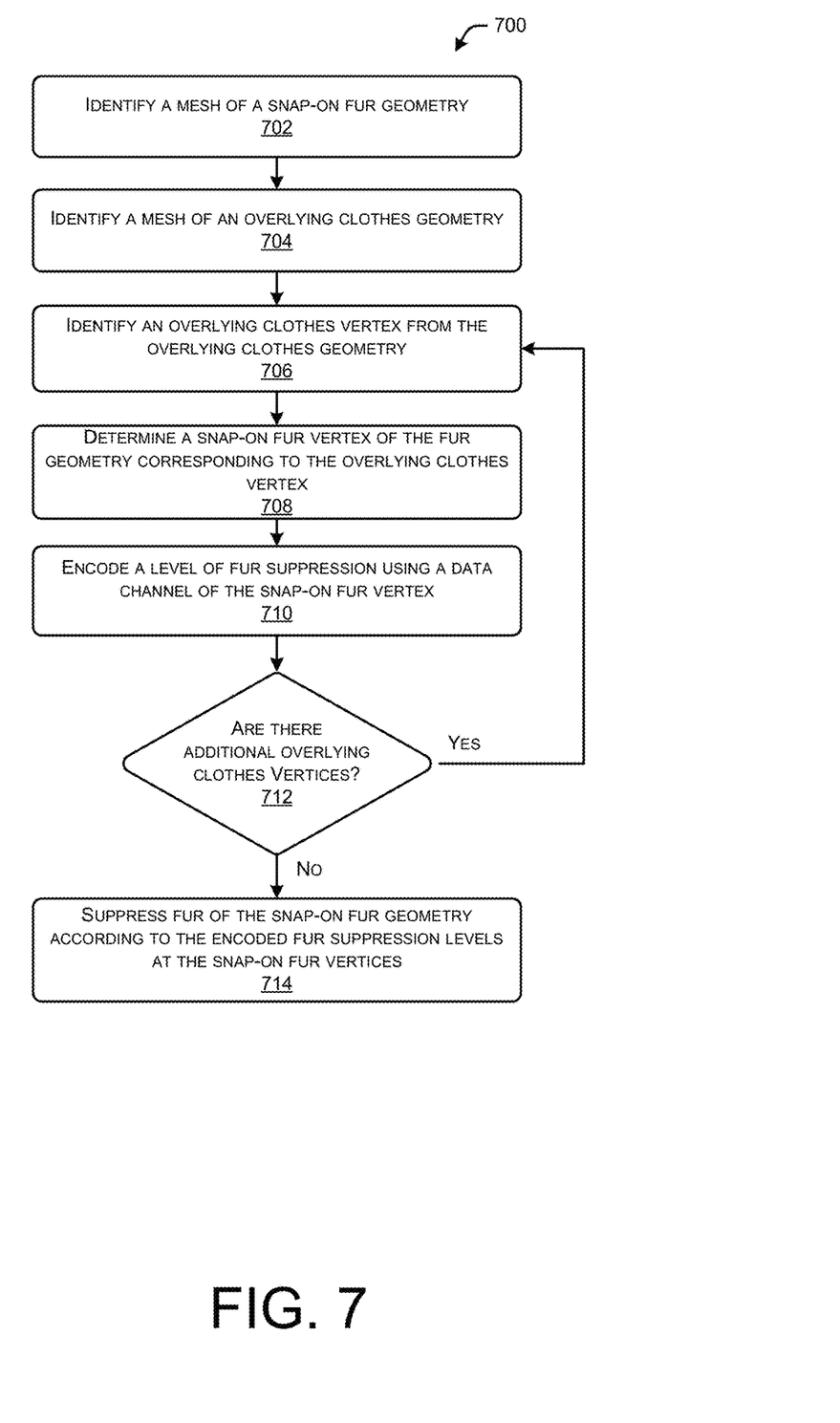
FIG. 7 illustrates a flow diagram of an example method for providing an overlying object over another snap-on object or base geometry by suppressing the underlying snap-on or base geometry, in accordance with example embodiments of the disclosure.

FIG. 7 illustrates a flow diagram of an example method 700 for providing an overlying object over a snap-on object or base geometry by suppressing the underlying snap-on or base geometry, in accordance with example embodiments of the disclosure. Method 700 may be performed by one or more image manipulation system(s) in example embodiments. In some cases, the image manipulation system(s) may cooperate with one or more other computing system(s) to perform the processes of method 500.

An overlying object may be an object that a user can drag over another object and place thereon. In a sense, the overlying object aligns onto the underlying object. In this context, an object that is placed over another object may not look natural if the volume of the underlying object is not suppressed in some cases. This may particularly be true in the case of objects that in real life may be compressible when another object is provided thereon. For example, a dog's fur may compress and/or be suppressed in volume, when pet clothing is provided thereon. It is in this respect that the volume of an underlying object may be suppressed when an overlying object is provided thereon. In this method 700, the process of suppression of an underlying object is described in the context of pet fur being compressed when pet clothing is provided thereon.

At block 702, a mesh of a snap-on fur geometry may be identified. The snap-on fur geometry may be selected by a user who wishes to place it on top of an object or character, such as the dog 602. If the user indicates that the snap-on fur is to be snapped on to the underlying object, then the snap-on fur 604 may be provided by one or more image manipulation systems over the base object, such as the dog 602.

At block 704, a mesh of overlying clothes may be identified. Again, the overlying clothes may be selected by a user for placement over the snap-on fur as identified by the operations of block 702. At block 706, an overlying clothes vertex from the overlying clothes geometry may be identified. An example, overlying clothes vertex may be selected by any suitable mechanism, such as by random selection from all of the vertices of the overlying clothes.

At block 708, a snap-on fur vertex of the fur geometry corresponding to the overlying clothes vertex may be determined. This determination may be based upon finding the snap-on fur vertex that is most proximal to the selected overlying clothes vertex. In some cases, vertex coordinates of the overlying clothes mesh and the snap-on fur mesh may be used to determine the correspondence between vertices of the two meshes. These vertex coordinates may be determined from one or more meshes, laid-out meshes, and/or DMAPs of the snap-on fur and/or the overlying clothes, with UV coordinates thereon.

At block 710, a level of fur suppression may be encoded using a data channel of the snap-on fur vertex. In some cases, the level of fur suppression may be provided by user input. For example, a user may define the level of fur suppression on the fur geometry when the clothes geometry is provided thereon. In some cases, the suppression level may be any suitable scale, such as a percentage level of suppression or a magnitude of vertex movement during suppression. In other cases, the suppression level may be a magnitude of change in a deformation weight of a vertex on a DMAP. The vertices may each have a number of data channels, such as RGB channels, for encoding the suppression levels. As an example, the level of fur suppression may be encoded on to the red channel of the vertex. However, any suitable channel associated with a vertex may be used for the purposes of encoding the level of suppression. Some of the fur vertices may have no suppression and may be encoded accordingly.

At block 712, it may be determined if there are additional overlying clothes vertices. If there are additional vertices in the overlying clothes mesh, then the method 700 may return to block 706 where the next vertex from the overlying clothes geometry may be identified for determining a suppression level of a corresponding fur vertex of the fur geometry. In this way, the fur vertices corresponding to the overlying clothes vertices may be encoded with a suppression level. At the conclusion of encoding these suppression levels on fur vertices, at block 712, it will be determined that there are no additional overlying clothes vertices, and the method 700 will proceed to block 714. At block 714, the fur of the snap-on fur geometry may be suppressed according to the encoded suppression levels of the snap-on fur vertices. In some cases, suppression of the fur may entail moving a fur vertex closer to the interior of the mesh. In example embodiments, the vertices may be deformed from their original locations to cause the suppression and/or reduction in volume of the fur.

According to some embodiments, the operations of method 700 may be performed out of the order presented, with additional elements, and/or without some elements. Some of the operations of method 700 may further take place substantially concurrently and, therefore, may conclude in an order different from the order of operations shown above.

Figure 8:
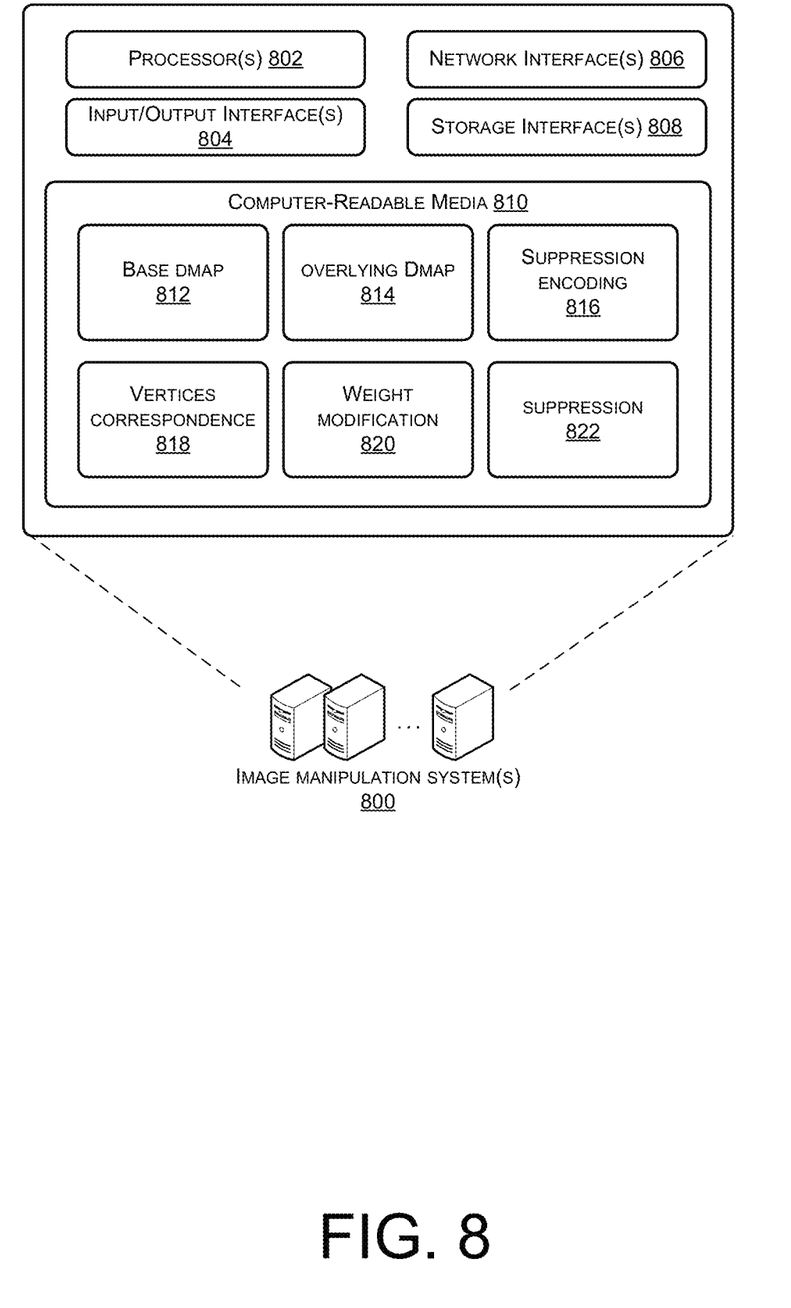
FIG. 8 illustrates a block diagram of example image manipulation system(s) that may provide vertices skinning weight manipulation and/or geometry suppression, in accordance with example embodiments of the disclosure.

FIG. 8 illustrates a block diagram of example image manipulation system(s) that may provide vertices deformation weight manipulation and/or geometry suppression, in accordance with example embodiments of the disclosure. The image manipulation system(s) 800 may include one or more processor(s) 802, one or more input/output (I/O) interface(s) 804, one or more network interface(s) 806, one or more storage interface(s) 808, and computer-readable media 810.

In some implementations, the processors(s) 802 may include a central processing unit (CPU), a graphics processing unit (GPU), both CPU and GPU, a microprocessor, a digital signal processor or other processing units or components known in the art. Alternatively, or in addition, the functionality described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 802 may possess its own local memory, which also may store programs, program data, and/or one or more operating systems. The one or more processor(s) 802 may include one or more cores.

The one or more input/output (I/O) interface(s) 804 may enable the image manipulation system(s) 800 to detect interaction with a user and/or other computing system(s). The I/O interface(s) 804 may include a combination of hardware, software, and/or firmware and may include software drivers for enabling the operation of any variety of I/O device(s) integrated on the image manipulation system(s) 800 or with which the image manipulation system(s) 800 interacts, such as displays, microphones, speakers, cameras, switches, and any other variety of sensors, or the like. In example embodiments, the I/O devices of the image manipulation system(s) 800 may include audio, video, and/or other input functionality.

The network interface(s) 806 may enable the image manipulation system(s) 1100 to communicate via the one or more network(s). The network interface(s) 806 may include a combination of hardware, software, and/or firmware and may include software drivers for enabling any variety of protocol-based communications, and any variety of wireline and/or wireless ports/antennas. For example, the network interface(s) 806 may comprise one or more of a cellular radio, a wireless (e.g., IEEE 802.1x-based) interface, a Bluetooth® interface, and the like. In some embodiments, the network interface(s) 806 may interfaces to the Internet. The network interface(s) 806 may further enable the image manipulation system(s) 800 to communicate over circuit-switch domains and/or packet-switch domains.

The storage interface(s) 808 may enable the processor(s) 802 to interface and exchange data with the computer-readable medium 810, as well as any storage device(s) external to the image manipulation system(s) 800. The storage interface(s) 808 may further enable access to removable media.

The computer-readable media 810 may include volatile and/or nonvolatile memory, removable and non-removable media implemented in any method or technology for storage of information, such as computer-readable instructions, data structures, program functions, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 810 may be implemented as computer-readable storage media (CRSM), which may be any available physical media accessible by the processor(s) 802 to execute instructions stored on the memory 810. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 802. The computer-readable media 810 may have an operating system (OS) and/or a variety of suitable applications stored thereon. The OS, when executed by the processor(s) 802 may enable management of hardware and/or software resources of the image manipulation system(s) 800.

Several functional blocks having instruction, data stores, and so forth may be stored within the computer-readable media 810 and configured to execute on the processor(s) 802. The computer readable media 810 may have stored thereon a base DMAP block 812, an overlying DMAP block 814, a suppression encoding block 816, a vertices correspondence block 818, a weight modification block 820, and a suppression block 822. It will be appreciated that each of the blocks 812, 814, 816, 818, 820, 822, may have instructions stored thereon that when executed by the processor(s) 802 may enable various functions pertaining to the operations of the image manipulation system(s) 800. It should further be noted that one or more of the functions 1112, 1114, 1116, 1118, 1120, 1122 may work in conjunction with one or more other imaging software, such as Maya® by Autodesk, Inc. of San Rafael, Calif.

The instructions stored in the base DMAP block 812, when executed by the processor(s) 802, may configure the image manipulation system(s) 800 to manage the DMAP(s) of the compound object image. The processor(s) 802 may be configured to generate and recognize a mesh of the base object, and store a DMAP with various UV coordinate mappings associated with individual ones of the vertices of the base object.

The instructions stored in the overlying DMAP block 814, when executed by the processor(s) 802, may configure the image manipulation system(s) 800 to manage the DMAP of the base object image. The processor(s) 802 may be configured to generate and recognize a mesh of the overlying object, and store a DMAP with various weights associated with individual ones of the vertices of the overlying object.

The instructions stored in the suppression encoding block 816, when executed by the processor(s) 802, may configure the image manipulation system(s) 800 to. The processor(s) 802 may accept user input on the level of suppression for various vertices of a mesh, such as a fur mesh. The processor(s) 802 may then encode that suppression level onto a data channel of the vertex. These data channels may be the RGB data channels associated with mesh vertices, or any other suitable metadata store.

The instructions stored in the vertices correspondence block 818, when executed by the processor(s) 802, may configure the image manipulation system(s) 800 to. The processor(s) 802 may find correspondence between overlying mesh vertices and underlying mesh, such as base mesh, vertices. The nearest vertices from layered meshes may be identified by the processor(s) 802 for the purposes of determining vertex correspondence. In some cases, UV and/or mesh coordinates of meshes may be employed in determining the correspondence of vertices from two different meshes.

The instructions stored in the weight modification block 820, when executed by the processor(s) 802, may configure the image manipulation system(s) 800 to modify the skinning weight of the underlying vertex according to properties of the overlying vertex. The underlying vertex deformation weight, in some example embodiments, may be set to the same value as the corresponding overlying vertex, if the corresponding overlying vertex is an edge vertex.

The instructions stored in the suppression block 822, when executed by the processor(s) 802, may configure the image manipulation system(s) 800 to suppress an underlying object, or portions thereof. This suppression may be a diminishment of the volume of the underlying object. This may be accomplished by moving the vertices of the underlying object closer together.

The illustrated aspects of the claimed subject matter may also be practiced in distributed computing environments where certain tasks are performed by remote processing devices that are linked through a communications network. In a distributed computing environment, program functions can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus implement one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A graphics processing system, comprising:
one or more processors; and
one or more non-transitory computer-readable media storing computer-executable instructions that, when executed by the one or more processors, cause the one or more processors to:
identify a base mesh of a base object;
identify a first vertex from an overlying mesh of an overlying object, the first vertex having a first skinning weight;
determine that the first vertex corresponds to a second vertex from the base mesh;
determine a second skinning weight of the second vertex;
determine, based at least in part on the second skinning weight and the first skinning weight, that the second skinning weight is to be modified;
generate a modified second skinning weight by setting the modified second skinning weight to a value less than or equal to the first skinning weight; and
update the second skinning weight with the modified second skinning weight.

2. The graphics processing system of claim 1, wherein the computer-executable instructions further cause the one or more processors to:
animate the base object according to the modified second skinning weight.

3. The graphics processing system of claim 1, wherein to determine that the first vertex corresponds to the second vertex, the computer-executable instructions further cause the one or more processors to:
determine that the second vertex is a most proximal vertex on the base mesh to the first vertex.

4. The graphics processing system of claim 1, wherein to determine that the second skinning weight is to be modified, the computer-executable instructions further cause the one or more processors to:
determine that the second skinning weight is non-zero.

5. The graphics processing system of claim 1, wherein to generate the modified second skinning weight, the computer-executable instructions further cause the one or more processors to:
determine that the first vertex is an edge vertex; and
set the modified second skinning weight to the first skinning weight.

6. The graphics processing system of claim 1, the computer-executable instructions further cause the one or more processors to:
determine that the first vertex is an interior vertex; and
remove the second vertex from the base mesh.

7. The graphics processing system of claim 1, wherein the overlying object is a first overlying object, the overlying mesh is a first overlying mesh, and wherein the computer-executable instructions further cause the one or more processors to:
identify a second overlying mesh of a second overlying object;
identify a third vertex from the second overlying mesh, the third vertex having a third skinning weight;
determine that the third vertex corresponds to the first vertex; and
generate a modified first skinning weight based at least in part on the first skinning weight and the third skinning weight.

8. The graphics processing system of claim 1, wherein the computer-executable instructions further cause the one or more processors to:
determine a suppression level for the first vertex encoded in a data channel associated with the first vertex; and
move the first vertex of the overlying object based at least in part on the suppression level.

9. A graphics-processing method, comprising:
identifying a first vertex of a first mesh of a first object;
determining, based at least in part on a deformation map (DMAP), that the first vertex corresponds to a second vertex from a second mesh of a second object, the second mesh underlying the first mesh;
determining a first skinning weight of the first vertex;
determining a second skinning weight of the second vertex;
generating, based at least in part on determining that the first vertex corresponds to the second vertex, a modified second skinning weight by setting the modified second skinning weight to a value less than or equal to the first skinning weight; and animating the second object according to the modified second skinning weight.

10. The graphics-processing method of claim 9, further comprising:
updating a set of skinning weights, stored in a skinning weight file of the second object, using the modified second skinning weight.

11. The graphics-processing method of claim 9, further comprising:
receiving user input to place the first object over the second object; and
placing, based at least in part on the user input, the first object over the second object.

12. The graphics-processing method of claim 9, wherein determining that the first vertex corresponds to the second vertex further comprises:
determining that the second vertex is a most proximate vertex from the second mesh to the first vertex when the first object overlies the second object.

13. The graphics-processing method of claim 9, further comprising:
determining that the first vertex is an interior vertex; and
removing the second vertex from the second mesh.

14. The graphics-processing method of claim 9, wherein generating the modified skinning weight further comprises:
determining that the first vertex is an edge vertex; and
setting the modified second skinning weight equal to a skinning weight of the first vertex.

15. The graphics-processing method of claim 9, further comprising:
identifying a third mesh overlying the first mesh;
identifying a third vertex from the third mesh, the third vertex having a third skinning weight;
determining that the third vertex corresponds to the first vertex; and
generating a modified first skinning weight based at least in part on the first skinning weight and the third skinning weight, wherein the modified first skinning weight is a value less than or equal to the third skinning weight.

16. A system, comprising:
one or more processors; and
one or more non-transitory computer-readable media storing computer-executable instructions that, when executed by the one or more processors, cause the one or more processors to:
identify a first overlying mesh of a first overlying object;
identify a second overlying mesh of a second overlying object;
identify a first vertex from the first overlying mesh;
determine a suppression level associated with the first vertex, wherein the suppression level corresponds to a magnitude by which a volume of the first overlying object is to be reduced at the first vertex by moving the first vertex, when the second overlying object overlies the first overlying object;
encode a data channel associated with the first vertex with the suppression level; and
generate a modified skinning weight associated with the first vertex.

17. The system of claim 16, wherein the computer-executable instructions further cause the one or more processors to:
determine the suppression level for the first vertex by accessing the data channel; and
reduce the volume of the first overlying object based at least in part on the suppression level.

18. The system of claim 17, wherein to reduce the volume of the first overlying object, the computer-executable instructions further cause the one or more processors to:
move the first vertex closer to two or more other vertices of the first overlying mesh.

19. The system of claim 17, wherein to generate a modified skinning weight associated with the first vertex, the computer-executable instructions further cause the one or more processors to:
determine that a second vertex from the second overlying mesh corresponds to the first vertex;
determine a skinning weight of the first vertex; and
generate the modified skinning weight of the first vertex as a value less than or equal to the skinning weight of the first vertex.

20. The system of claim 19, wherein the computer-executable instructions further cause the one or more processors to:
animate the first overlying object based at least in part on the modified skinning weight.

* * * * *